Feb. 9, 1943. G. H. ORR 2,310,309
FLUID CONTROL DEVICE
Filed May 17, 1939
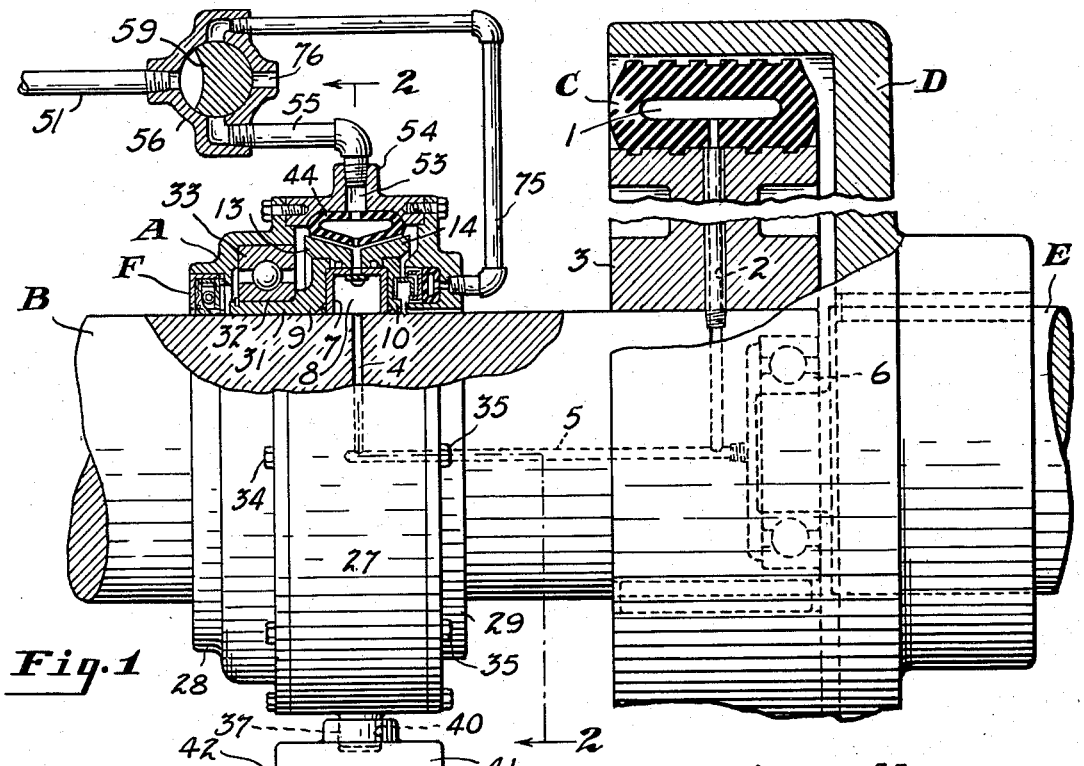
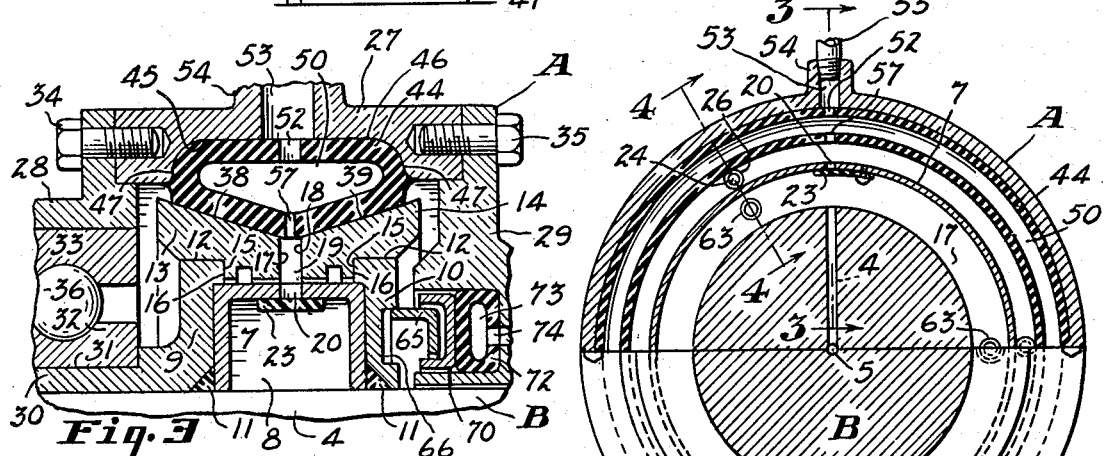
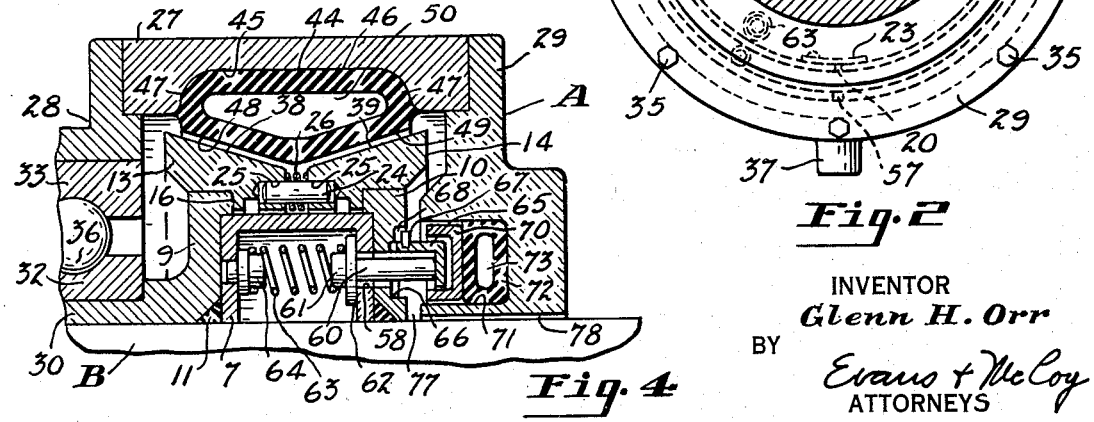
INVENTOR
Glenn H. Orr
BY Evans & McCoy
ATTORNEYS Patented Feb. 9, 1943

2,310,309

UNITED STATES PATENT OFFICE 2,310,309

FLUID CONTROL DEVICE

Glenn H. Orr, Akron, Ohio, assignor to The General Tire & Rubber Company, Akron, Ohio, a corporation of Ohio Application May 17, 1939, Serial No. 274,238

22 Claims. (Cl. 137—69)

This invention relates to rotary seals and the like, such as are used to control the flow of fluid into and out of a passage in a rotating shaft; more particularly the invention has reference to a device of this character which is to be used infrequently for the occasional introduction of fluid under pressure into a shaft passage or for the occasional release of fluid from such passage.

In devices which require the supply or release of fluid of one kind or another to or from a passage in a rotating shaft, some difficulty has been experienced because of the wear which occurs in the packing gland or other seal of the joint between the rotating parts of the system and the stationary parts of the system. Where the connection between the shaft passage and the stationary portions of the fluid system is effected at one end of the shaft, the wear due to the sliding friction is not excessive and conventional packing glands are satisfactory for most purposes. However, where the connection between the rotating shaft passage and the relatively stationary parts of the fluid system are to be effected at a point of the shaft intermediate the ends thereof, considerably greater difficulties arise because of the increased areas of the friction surfaces involved and the greater relative velocity of the sliding parts with respect to one another. In many applications fluid need be forced into or released from the shaft passage only during a relatively short period of time and at discontinuous or intermittent intervals. Therefore, it is apparent that conventional fluid sealing devices which maintain a continuous fluid seal between the rotating shaft passage and the stationary external parts of the system are subjected to unnecessary and excessive wear which dissipates power and shortens the life of the device. It is therefore an object of the present invention to provide a device for effecting a fluid seal between a rotating shaft passage and an external fluid supply in which the parts are normally relieved of excessive sliding frictional engagement and in which the parts are adapted to be brought into fluid sealing engagement with one another at intermittent discontinuous intervals as required.

Another object is to provide in a device of the character described, improved means for introducing fluid under pressure into a rotating shaft passage at intermittent time intervals and means for releasing fluid under pressure from the rotating shaft passage at intermittent time intervals.

Another object is to provide a rotary seal in which the means for introducing fluid under pressure into the rotating shaft passage is relatively independent of the means for releasing fluid from the rotating shaft passage.

Another object is to provide a rotary fluid seal for controlling the flow of fluid into and out of a rotating shaft passage in which the packing gland is normally spaced from the rotating portions of the assembly and is brought into frictional engagement only during such time intervals as are required for the flow of fluid. More specifically, the invention aims to provide a seal of the character mentioned in which a normally rotating part or parts, carried by the shaft, are frictionally engaged by the packing gland during the time intervals when it is desired to flow fluid into the shaft passage, so that the frictional engagement between the gland and rotating members causes the latter to cease rotating.

A further object is to provide a device for controlling the flow of fluid into and out of a rotating member or shaft, which is relatively simple in design and construction and inexpensive to manufacture. Other objects and advantages will become apparent from the following detailed description of a suitable embodiment of the invention made in connection with the accompanying drawing, in which:

Figure 1 is a fragmentary side elevational view, partly diagrammatic and partly in section and with parts removed, of a disconnectable drive mechanism showing the application of my rotary seal or fluid flow control device to the drive shaft;

Fig. 2 is a transverse sectional view of the fluid flow control device taken substantially on the line 2—2 of Fig. 1;

Fig. 3 is a fragmentary detail in section showing the manner in which the deformable gland engages the annular member or members to effect a fluid-tight seal therewith. This view is taken substantially on the line 3—3 of Fig. 2 and is enlarged with respect thereto; and Fig. 4 is a fragmentary detail in section taken substantially on the line 4—4 of Fig. 2 and enlarged with respect thereto.

The present invention contemplates a construction in which a deformable gland, disposed about a rotatable shaft and utilized in effecting a fluid-tight seal between the rotating and stationary parts of the device, is normally disposed in confronting spaced relation with respect to the rotating parts and is arranged to be brought into frictional engagement with such rotating parts during the time intervals when it is desired to establish a fluid seal and to flow fluid into the shaft. The invention also contemplates means for releasing fluid from a rotating shaft which includes an actuating element normally disengaged from the rotating parts and movable to engage one or more of the rotating parts during such period or periods of time as the releasing of fluid occurs. The specific embodiment shown in the drawing and the application of the invention to a power drive assembly will now be described, reference being made to the various parts by letters and numerals which indicate like parts throughout the several views.

The fluid control device or rotary seal is indicated generally at A and is mounted on a shaft B which carries a drive wheel including a deformable annulus C of the drive mechanism or power transmission device. The annulus C is engageable with the inside cylindrical surface of a drum-like friction member D secured on a driven shaft E. The resilient disconnectable drive, including the deformable element C and the friction drum D, form no part of the present invention and are shown for the purpose of illustrating one application of the fluid flow controlling or rotary sealing device A. In order to establish a drive between the members C and D, fluid is introduced into chamber 1 of the deformable element C to expand or inflate the same through a radial passage 2 in the shaft B and wheel 3 on which the annulus C is mounted. The passage 2 and a radial passage 4 removed from the region of the wheel 3 are connected by an axial passage 5 formed in the shaft B.

If desired, the shafts B and E may be retained in alignment by a bearing assembly 6, it being understood, of course, that for the purpose of the present invention the specific arrangement of the drive and driven shafts and other parts of the assembly are immaterial and that the novel features are to be found in the fluid control or rotary seal A.

Disposed about the shaft B is an annular ring-like member 7 which is U-shaped in cross section and has spaced parallel flange portions which are in circumferential seating engagement with the surface of the shaft B, thus defining an annular fluid chamber 8. The member 7 is secured to the shaft for rotation therewith and is disposed so that the chamber 8 is in communication with the radial passage 4 in the shaft. On opposite sides of the member 7 are a pair of guides 9 and 10 which may extend circumferentially about the shaft B and abut against the side flanges of the member 7. Preferably, gaskets 11 of rubber or other suitable packing material and triangular in section are received in cutaway portions of the guides 9 and 10 and are arranged to be forced against the shaft B and edges of the flanges of the member 7 so as to effect a seal between these parts. The rings 9 and 10 may be secured to the shaft B in any suitable manner such as by welding, so that the guides rotate with the shaft and prevent the device from moving axially on the shaft and to prevent the guides from spreading apart.

The guides 9 and 10 are provided with outwardly directed circumferential friction surfaces 12 which are concentric to the axis of rotation of the shaft B and are preferably of approximately equal radius to receive the mating surfaces of an annular fluid transferring member or ring which may be a single integral structure, or, as shown, may comprise a cooperating pair of annular friction members or rings 14 and 15. These rings are circumferentially slidable on the surfaces 12 of the guides 9 and 10, but normally rotate with the shaft B through frictional engagement with the guides. Desirably, the friction surfaces 12 of the guides 9 and 10 may be formed of hardened steel, while the annular ring members 13 and 14 may be of brass or similar wear-resisting material that slides well on steel. The guides 9 and 10 extend radially beyond the chambered member 7 to provide circumferential radial shoulders 15, against which radial surfaces 16 of the annular rings 13 and 14 abut to prevent axial movement of the rings.

The rings 13 and 14 are disposed on the guides 9 and 10 so that inner radial faces 17 and 18 of the rings are slightly spaced from one another to provide an approximately circumferentially continuous passage 19 through the fluid transfer member, which communicates with the chamber 8 through one or more openings or holes 20 in the annular member 7. To keep these holes normally closed or sealed, they are provided with automatic uni-directional valves such as flap valves 23, of rubber or other suitable flexible resilient material. These valves are arranged so that while the flow of fluid or air into the chamber 8 through the passage 19 and opening or openings 20 is permitted, outflow of fluid or air through the openings 20 is arrested or prevented.

While the annular fluid transferring member is shown as composed of the two rings 13 and 14 and their connecting parts, it is to be understood that the rings may be integral or rigidly secured together. In such case, the passage 19 could be formed through the central part of the member and function in the manner set forth herein. The formation of the fluid transfer member in several parts is for the purpose of effecting and maintaining, over prolonged periods of use, of an effective seal between the guides 9 and 10 and the same member; the springs 26 compensating for wear of the parts. Accordingly, where it is stated that the fluid passage extends through the annular fluid transfer member or ring, reference is made to the circumferential passage 19 which, although between the parts 13 and 14, extends through the fluid transfer member comprising such parts.

A multiplicity of axially disposed hardened steel pins 24 extend between the annular rings 13 and 14 and are slidingly received thereby in sockets 25. These pins connect the rings so that the latter rotate in unison, and helical compression springs 26 disposed about the pins 24 and bearing against the faces 17 and 18 normally urge the rings 13 and 14 axially apart so as to press the radial surfaces 16 thereof against the shoulders 15 of the guides, thus establishing a sufficiently effective fluid tight seal between the guides and the annular rings or fluid transferring member.

The guides 9 and 10 with the annular ring member 13 and 14 and the chambered member 7 embraced thereby are disposed within a relatively stationary housing assembly comprising body member 27 and end members 28 and 29. This housing may be supported in any suitable fashion, one manner being to carry the same on the shaft B, as shown. For this purpose the guide 9 is formed with an axial extension portion 30 which embraces the shaft B and is provided with a reduced diameter end 31 which receives inner race 32 of a ballbearing assembly. Outer race 33 is secured within and circumferentially embraced by end member 28 of the housing assembly, the said end member being secured to the body member 27 by bolts 34 and end member 29 being secured to the body member by bolts 35. In this manner the housing assembly is rotatably mounted on the shaft B by means of ball bearings 36. A radially extending foot 37 is formed on the body member 27 and is received with a socket 40 of a pedestal 41 which is held in a stationary position such as by being secured to a suitable foundation 42. It is to be understood that the foot 37 has a relatively loose fit or connection in the socket 40 so as to permit slight radial or axial shifting of the rotary seal A during operation while preventing rotation of the same.

The annular rings 13 and 14 of the fluid transfer member are provided with outwardly directed friction surfaces 38 and 39, each of which is preferably of tapered conical form. These friction surfaces are arranged so that they slope radially inwardly toward the circumferential passage 19, the large diameter portions of the rings 13 and 14 being remote from one another.

Secured on the inside of the body member 27 and in confronting relation to the surfaces 38 and 39 of the fluid transfer member is an annular deformable gland member 44 which may be formed of any suitable resilient material such as rubber composition having sufficient inherent stiffness or resiliency to normally retain its shape. Preferably, the gland 44 is received within an annular channel or groove 45 formed in the body 27, so that in securing the gland to the body, such as by vulcanization, the bond may extend across the entire axial length of outer circumference 46 of the gland and over end surfaces 47 thereof. Inwardly directed circumferential or annular friction surfaces 48 and 49 of the gland are disposed in substantially parallel confronting relation with respect to the surfaces 38 and 39 of the rings 13 and 14.

As shown in Fig. 4, the friction surface 48 of the gland is normally spaced from the friction surface 38 of the annular ring 13 and is parallel thereto. Similarly, the friction surface 49 of the gland is normally disposed in spaced parallel relation with respect to the friction surface 39 of the annular ring 14. A circumferentially extending chamber 50 is formed within the gland 44 and fluid under pressure may be introduced therein through a passage 52 formed in the gland and communicating with a conduit 55 through a passage 53 formed in an extension 54 of the body member 27. The conduit 55 is connected to a supply pipe 51 communicating with a suitable source of air or other fluid under pressure (not shown) through a four way control valve 56. The valve 56 is of conventional construction and has a rotatable body 59 provided with a passage which may be positioned to connect the port leading to the conduit 55 with the port leading to the supply pipe 51. Accordingly, by manipulation of the valve 56, high pressure fluid may be introduced into the chamber 50 of the gland 44. Preferably, this chamber is co-extensive with the friction surfaces 48 and 49, or substantially so, to effect a more efficient frictional engagement between the gland and the annular fluid transfer member, as will later appear.

One or more radial passages 57 are formed through the inner wall of the gland 44 substantially in the plane of the juncture between the friction surfaces 48 and 49 thereof. The passages 57 are thus normally in radial alignment with the continuous circumferential passage 19 through the annular fluid transfer member and between the ring members 13 and 14. Furthermore, the passages 57 are of such restricted cross-sectional area that upon the introduction of high pressure fluid into the chamber 50 of the gland, the later is distended due to the restricted outflow of air or fluid through the passages 57. Hence upon such distension of the gland 44, the frictional surfaces 48 and 49 thereof engage the friction surfaces 38 and 39, respectively, of the annular ring members 13 and 14. The frictional grip of the gland on the ring members 13 and 14 of the fluid transfer member, which are embraced by the gland, is sufficiently strong to cause slippage or sliding to occur between the ring members and the guides 9 and 10, so that the fluid transfer member is held against rotation while the shaft B continues to rotate therein. Additionally, the frictional engagement of the surfaces 38 and 39 of the gland with the friction surfaces of the rings 13 and 14 effects an approximately fluid-tight seal between the gland and fluid transfer member so that high pressure fluid or air flows from the chamber 50 of the gland through the passage or passages 57, into the circumferential passage 19, and thence into the chamber 8 through the holes 20 and flap or check valves 23. The chamber 8, being in communication with the radial passage 4 in the shaft B, conducts the high pressure air or fluid into the passages in the shaft from which the fluid flows into the passage 2 and thence into the chamber 1 of the deformable annulus C. Thus inflated, the drive annulus is brought into frictional engagement with the frictional surface of the drum D to establish the driving connection between the shaft B and the shaft E.

A plurality of apertures 58, three in the embodiment illustrated, are formed through the guide 10 and the side flange of the chambered member 7 which is disposed against the guide 10. Extending through each of the apertures 58 is a pin 60 having a head 61 provided with a radially directed circumferentially continuous flange 62 which seats against the inside of the chambered member 7 about the apertures 58 to normally seal the same. The flange 62 is held against the member 7 in sealing position by means of a helical compression spring 63. One end of the spring embraces the head 61, while the other end of the spring is received on a stud 64 secured in the flange portion of the member 7 which is opposite the apertures 58 and the pins 60. The outer ends of the pins 60 are secured in one flange of a ring 65 of angular section. This ring is disposed about the shaft B and is guided in a circular channel 66 formed in the guide 10, being held against circumferential movement relative to the guide 10 by means of a pin 67 secured in the ring and axially slidable in a recess 68 in the guide 10.

The angular sectioned ring 65 extends axially of the shaft B beyond the guide 10 and its exposed end is embraced by a circular element 70 of U-shaped section which opens toward the angular sectioned ring. The U-shaped ring or actuating element 70 is carried in a circular channel 71 which is formed in the end member 29 of the housing assembly and opens inwardly toward the guide 10. Between the bottom of the channel 71 and the web portion of the U-shaped actuating ring 70 is disposed an inflatable bag 72 formed of a suitable flexible material, such as rubber. This bag is preferably circumferential in extent, being continuous around the shaft B and underlying all portions of the ring 70. It is to be understood, of course, that other means for actuating the ring may be employed. The normal position of the parts shown in Fig. 4 is such that the actuating ring element 70 is out of engagement with the angular sectioned ring 65, so that the sealing flanges 62 of the pins 60 are held by the springs 63 against the member 7 to seal the chamber 8. An air or fluid chamber 73 in the bag 72 is connected by a passage 74 with a conduit 75 secured in the end member 29 of the housing assembly and communicating with the previously mentioned source of high pressure fluid or air through the control valve 56. The passage in the valve body 59 is arranged so that upon movement of the valve body to a second position the fluid supply pipe 51 may be connected to the conduit 75 for inflation of the actuating bag 72. Movement of the valve body 59 to connect the supply pipe 51 and the conduit 75 automatically disconnects the supply pipe and the conduit 55 leading to the gland 44. Hence, the supply pipe may be connected to either the gland 44 or the actuating bag 72, but not to both at the same time. In a third positon to which the valve body 59 may be moved, the conduit 75 may be connected through the passage in the valve body to an outlet 76 in the valve 56 so as to permit the release of fluid from the actuating bag 72. This bag is of sufficient resiliency to resume its normal shape upon the release of fluid pressure therefrom. The actuating element 70 is secured to the bag 72, such as by vulcanization, so that upon release of the fluid pressure in the bag the actuating element is retracted into the channel 71 by the contraction of the bag to its normal shape. This retraction of the element 70 withdraws the same from engagement with the ring 65. When the bag 72 is inflated, the actuating ring element 70 is forced to the left, as viewed in Figs. 3 and 4, so as to engage the angular sectioned ring 65, forcing the same to the left and moving the pins 60 in the apertures 58 to unseat the valve flanges 62 and release air from the circular chamber 8. It is to be understood that sufficient clearance is provided between the pins 60 and the walls of the passages 58 to permit the flow of fluid therethrough. From the passages 58 the released fluid or air flows in space 77 between the rotattable assembly (comprising the guides 9 and 10, annular rings 13 and 14, chambered member 7 and related parts) and the relatively stationary assembly (comprising the housing members previously described and their related parts). A clearance 78 between the inner circumferential surface of the end member 29 and the shaft B affords an escape passage for air in the space 77.

The operation of the device in connection with the drive mechanism or assembly shown in the drawing is as follows: Assuming the shaft B to be rotating with the deformable annulus C disconnected from the drum D, a driving connection may be established by introducing high pressure fluid or air into the chamber 1 of the deformable annulus C. To do so the operator actuates or positions the valve body 59 of the valve 56 so that the chamber 50 of the gland 44 receives high pressure fluid or air from the source of supply, as previously described. The gland, thus inflated, expands into frictional engagement with the rings 13 and 14 comprising the fluid transfer member so that the latter is progressively brought to a stop and slides circumferentially about the guides 9 and 10 so long as the rings 13 and 14 are engaged by the gland 44, see Fig. 3. Upon engagement of the friction surfaces 38 and 39 of the annular rings by the surfaces 48 and 49, respectively, of the gland, the escape of air or fluid between the rotating stationary parts is substantially, though not necessarily completely, arrested. Additional high pressure fluid or air introduced into the chamber 50 of the gland flows through the passages 57 into the annular or circumferential passage 19 through the fluid transfer member between the rings 13 and 14. The chambered member 7 is now rotating relative to the rings 13 and 14 but the holes 20 therein retain continuous communication with the circular channel passage 19 so that the high pressure fluid therein flows into the chamber 8, thence into the passages 4, 5, and 2, and finally into the chamber 1 of the drive annulus C. During the inflation of the annulus C the valve flanges 62 of pins 60 prevent the escape of fluid from the chamber 8, being held in sealing engagement with the walls of the chamber by the compression spring 63 and the pressure of the fluid therein. As soon as sufficient fluid has been introduced into the chamber 1 of the drive annulus the operator closes the valve 56 by moving the valve body 59 to a position in which the passage therein is sealed from the port which communicates with the supply pipe 51. Because of slight leakage of fluid between the engaged parts of the device, the pressure in the chamber 50 is relieved and the inherent resiliency or stiffness of the gland 44 causes the same to assume its normal position (see Fig. 4). Escape of fluid or air from the chamber 8 is prevented, however, by the check valves 23, so that a closed fluid system is maintained to retain the drive annulus C inflated.

When it is desired to release the driving connection between the parts C and D, the operator introduces high pressure fluid or air into the chamber 73 of the bag 72 by manipulation of the valve 56. The inflated bag 72 forces the channel ring or actuating element 70 to the left, as viewed in Figs. 3 and 4, so as to slidingly engage the angular sectioned ring 65 and move the same to the left, it being understood that the channel 66 is of sufficient depth to permit this movement. Accordingly, the valve flanges 62 are unseated, against the force of the springs 63 and the fluid pressure, to permit the escape of fluid from the chamber 8 and the drive annulus chamber 1.

It is apparent from a study of the disclosure set forth above that the present invention provides a mechanism for controlling the flow of fluid or air into and out of a passage in a rotating shaft which mechanism is particularly adapted for use in applications wherein the flow of fluid is required during relatively short periods at intermittent intervals. During such periods as fluid is to be neither introduced nor released from the passages 4 and 5 of the shaft B, the only engagement between the relative stationary assembly of the device and the rotating assembly of the device is through the ball bearings 36, thus eliminating excesssive wear which would ordinarily occur in devices having continuous sliding engagement with one another. If desired, a flexible seal F of conventional construction may be mounted in the end member 28 and arranged to have circumferential sliding engagement with the shaft B to protect the ball bearings and their races and other parts of the device from dirt and dust.

Such sliding as occurs between the parts of the device is limited to periods of inflation or deflation of the drive annulus C, or other mechanism controlled by the rotary seal of the present invention, so that wear is reduced to a minimum and the life of the sealing device is effectively prolonged.

The principles of the present invention may be utilized in numerous constructions, changes being made in the particular details shown and described as desired, it being understood that various modifications and alterations are contemplated and that the embodiment shown is given for purposes of explanation and illustration.

What I claim is:

1. A rotary fluid controlling device and seal for a shaft comprising an annular member rotatably mounted on the shaft but normally rotatable therewith, a relatively stationary member mounted adjacent the annular member and movable toward the annular member to frictionally engage the same and arrest rotational movement of the annular member, interconnecting passages through the members, means connecting one of said passages with the shaft, and means connecting one of the passages with a fluid conduit.

2. A rotary fluid controlling device and seal for a shaft comprising an annular member rotatably mounted on the shaft, a passage through said member and communicating with the shaft, a deformable stationary member mounted adjacent and in concentric relation to the annular member and adapted to be deformed into frictional engagement with the annular member to prevent relative rotation between the members, a passage through the deformable stationary member adapted to register with the passage in the annular member when the members are frictionally engaged, and a fluid conductor connected to the deformable member.

3. A fluid seal construction for a rotatable shaft comprising an annular guide track extending circumferentially around the shaft, an annular member rotatably mounted on the track and having sufficient frictional engagement therewith to normally rotate with the shaft, a peripheral friction surface on said member, a deformable gland mounted in a substantially stationary position adjacent said member and having a friction surface engageable with the peripheral surface on the member upon deformation of the gland to thereby hold the member against rotation and effect sliding of the member on the guide track.

4. A fluid seal device for a shaft comprising an annular guide member secured on the shaft and rotatable therewith, an annular fluid transfer member disposed about the shaft and rotatably mounted on the guide, a circumferential friction surface on said transfer member, a deformable gland mounted in a relatively stationary position adjacent the friction surface and normally separated therefrom, said gland being adapted upon deformation to engage the frictional surface of the transfer member to arrest the rotation thereof and to cause the member to slide on the guide.

5. A fluid seal device for a rotatable shaft comprising a pair of circular guides disposed about the shaft and secured thereto for rotation with the shaft, a pair of rings disposed about the shaft and mounted on the guides, said rings being slidable on the guides but normally rotating therewith through frictional engagement with the guides, a deformable gland mounted in a relatively stationary position in confronting relation with respect to said rings, said gland being adapted, upon being deformed, to frictionally engage said rings and to arrest the rotational movement thereof, said rings having sliding movement about the guides when so arrested by the gland.

6. A device of the character described for controlling the flow of fluid in a shaft comprising a pair of annular ring members disposed about the shaft and normally rotatable therewith in unison, a fluid passage through the rings, a deformable rubber gland mounted adjacent the members, said gland being adapted upon deformation to frictionally engage both annular members to arrest the rotation thereof, and a fluid passage in the gland registerable with said fluid passage through the rings for the flow of fluid between the gland and the ring members.

7. A fluid seal device for a shaft comprising a pair of annular ring members disposed about the shaft in side by side relation and rotatable with respect thereto, a fluid passage through the rings, an annular deformable rubber gland disposed about the shaft in confronting relation with respect to both said annular members, said gland being of greater axial extent than radial thickness, a chamber within the gland, means for introducing a fluid under pressure to said chamber to deform the gland, a fluid passage in the gland registerable with said fluid passage through the rings, and said gland being adapted upon distortion to frictionally engage the annular members and to arrest the rotation thereof about the shaft, with said fluid passages in register for the flow of fluid between the gland and ring members.

8. A shaft sealing device of the character described comprising a pair of annular ring members disposed about the shaft in side by side relation and having therebetween a passage for fluid communicating with a passage in the shaft, said members being rotatable relative to the shaft but normally rotating therewith through frictional engagement, a rubber gland mounted in confronting relation with respect to said members, a chamber in the gland, means for introducing a fluid under pressure into the chamber for deforming the gland into frictional engagement with the annular members to arrest the rotation of the latter, and a passage in the gland communicating with the passage between the annular members for the flow of fluid from the gland into the shaft while the annular members are held against rotation by frictional engagement with the gland.

9. A shaft sealing device of the character described comprising a pair of guide members disposed about the shaft and secured thereto for rotation with the shaft, a pair of annular ring members disposed about the shaft and having sliding engagement with the guides, said ring members normally rotating with the shaft because of the frictional engagement between the ring members and the guides, a deformable gland mounted in a relatively stationary position adjacent the annular ring members, said gland being arranged upon deformation to engage the annular members to arrest the rotation of the same, and openings through the gland and between the annular members for the passage of fluid into the shaft.

10. A shaft sealing device comprising a pair of guide members disposed about the shaft and secured thereto for rotation with the shaft, a pair of annular ring members disposed about the shaft and having sliding engagement with the guides, said ring members normally rotating with the shaft because of the frictional engagement between the ring members and the guides, a deformable gland mounted in a relatively stationary position adjacent the annular ring members, said gland being arranged upon deformation to frictionally engage the annular ring members to arrest the rotation of the same, openings through the gland and between the annular members for the passage of fluid into the shaft, and resilient means for urging the annular members into frictional engagement with the guides to retain a sliding seal therewith while the annular members are held stationary by the gland.

11. A rotary seal for a shaft comprising a guide disposed about the shaft and secured thereto for rotation with the shaft, an annular ring member disposed about the shaft and slidingly mounted on the guide, a relatively stationary housing arranged so that the guide is journaled in the housing, a deformable rubber gland carried by the housing in confronting relation with respect to the annular member, and means for effecting deformation of the gland to bring the latter into frictional engagement with the annular ring member.

12. A construction for releasing fluid from a passage in a rotating shaft, comprising a member disposed about the shaft and having a chamber in communication with the shaft passage, a valve carried by the member and arranged upon being actuated to release fluid from the chamber, a ring disposed about the shaft adjacent the member and guided for axial movement relative to the shaft, an inflatable bag disposed adjacent the ring, and means for introducing a fluid under pressure into the bag to expand the same and thereby move the ring to actuate the valve and release fluid from the chamber.

13. In a device of the character described for controlling the flow of fluid into and out of a passage in a rotating shaft, a member disposed about the shaft and having a chamber in communication with the shaft passage, an annular ring member disposed about the shaft and normally rotating therewith through frictional engagement, a deformable rubber gland mounted in a relatively stationary position adjacent the annular ring member, means for deforming the gland into frictional engagement with the annular ring member to arrest the rotation of the latter, and fluid passages for conducting fluid through the gland past the annular ring member and into said chamber.

14. In a device of the character described for controlling the flow of fluid into and out of a passage in a rotating shaft, a member disposed about the shaft and having a chamber in communication with the shaft passage, an annular ring member disposed about the shaft and normally rotating therewith, a deformable rubber gland arranged to be brought into frictional engagement with the annular ring member to arrest the rotation thereof, means for conducting fluid through the gland past the annular ring member and into the chamber, a valve carried by the chambered member and arranged, upon being actuated, to release fluid from the chamber, a second annular ring disposed about the shaft adjacent the valve and guided for axial movement relative thereto, and means for moving the second ring to actuate the valve and release fluid from the chamber.

15. In a device of the character described for controlling the flow of fluid into and out of a passage in a rotating shaft, a rotatable assembly mounted on the shaft for rotation therewith including means defining a chamber in communication with the shaft passage and an annular ring member disposed about the shaft and circumferentially slidable on other members of the assembly, a relatively stationary assembly disposed about the shaft and the rotatable assembly and including a deformable gland located in confronting relation with respect to the annular ring member and arranged, upon deformation, to frictionally engage the annular member and resist rotation of the latter, and aligned passages in the rotatable and stationary assemblies through which fluid may be conducted.

16. In a device of the character described for controlling the flow of fluid into and out of a passage in a rotating shaft, a relatively stationary housing assembly disposed about the shaft, a rotatable assembly disposed about the shaft and secured thereto for rotation with the shaft, said rotatable assembly being journaled within the housing, means defining a fluid chamber in the rotatable assembly in communication with the shaft passage, said stationary assembly including a deformable member carried in confronting relation to a member of the rotatable assembly, a fluid passage through the deformable member, a fluid passage through the rotatable assembly communicating with the chamber, and means for deforming the deformable member into engagement with said confronting member of the rotatable assembly to effect therewith a substantially fluid-tight seal with the passage through the deformable member in alignment with the passage in the rotatable assembly to permit the flow of fluid therethrough into the chamber.

17. In a device of the character described for controlling the flow of fluid into and out of a passage in a rotating shaft, a member disposed about the shaft and having a chamber in communication with the shaft passage, a pair of guides disposed about the shaft, a pair of annular ring members disposed about the shaft and having circumferential sliding engagement with the guides, means for resiliently pressing the annular members against the guides to retain a substantially fluid-tight seal therewith, a fluid passage between the annular ring members and communicating with the chambered member, a housing disposed about the shaft and held against rotation, bearings between the housing and one of the guides, an annular deformable gland carried by the housing and disposed in confronting relation with respect to said annular ring members, said gland having a fluid receiving chamber and a passage aligned with the passage between the annular ring members, means for introducing a fluid under pressure into the gland chamber to deform the gland into frictional engagement with the annular ring members to hold the latter against rotation and effect a substantially fluid-tight seal between the gland and the annular ring members, whereby fluid from the gland chamber may flow into the chambered member through the passages, a valve carried by the chambered member and arranged upon being actuated to release fluid from the chamber of the chambered member, a ring disposed about the shaft and guided for axial movement with respect thereto by the housing, and means for moving the ring to engage and actuate the valve to release fluid from the chamber.

18. In a device of the character described for controlling the flow of fluid in a rotatable shaft, means on the shaft providing an outwardly opening circumferentially extending channel surrounding the shaft, a deformable gland extending circumferentially about the shaft and means supporting the same in relatively stationary position over the path of the channel, a fluid passage in the gland, and means for deforming the gland into sealing engagement with said means on the shaft and with said passage in registry with the channel for the flow of fluid therebetween.

19. In a device of the character described for controlling the flow of fluid in a rotatable shaft, means on the shaft providing an annular sealing surface, means defining a passage in the shaft opening through said surface, a chambered deformable gland extending circumferentially about the shaft, said gland being expendable upon inflation thereof, means supporting the gland in normally spaced relatively stationary position over said surface, means for introducing fluid under pressure into the gland chamber to inflate the gland and thereby expand and deform the gland into engagement with said surface, and a relatively small passage through the gland and disposed to register with the shaft passage, said small passage being of such size as to maintain deforming inflation of the gland while fluid is supplied at said pressure, whereby fluid introduced into the gland chamber to deform the same flows through the small passage into the shaft passage.

20. In a device of the character described for controlling the flow of fluid in a rotatable shaft, ring means on the shaft formed with an outwardly directed V shaped sealing surface and a shaft passage opening through said surface, said ring means having shoulder means engaging shoulder means on the shaft and resisting axial movement of the ring means on the shaft, an arcuate gland supported in overlying relation to the ring means and having an inwardly directed V shaped sealing surface, a fluid passage through the gland, and means for moving the gland so that the sealing surface thereof engages the sealing surface of the ring means with the gland passage in registry with the shaft passage, said V shaped surfaces being so inclined as to hold the ring shoulder means against the shaft shoulder means by the pressure of engagement between the gland and the ring means.

21. In a device of the character described for controlling the flow of fluid in a rotatable shaft, ring means on the shaft formed with an outwardly directed V shaped sealing surface and a shaft passage opening through said surface, said ring means having shoulder means engaging shoulder means on the shaft and resisting axial movement of the ring means on the shaft, a chambered and deformable gland supported in overlying relation with the ring means and having an inwardly directed V shaped sealing surface, means for introducing a fluid under pressure into the gland to deform the same and move the sealing surface thereof into engagement with the sealing surface of the ring means, and a passage through the gland adapted to register with the shaft passage for the flow of fluid therethrough, said V shaped surfaces being so inclined as to hold the ring shoulder means against the shaft shoulder means by the pressure of engagement between the gland and the ring means.

22. In a device of the character described for controlling the flow of fluid in a rotatable shaft, a passage in the shaft, a valve carried by the shaft and communicating with the passage, an element having connection with the valve and movable axially of the shaft to actuate the valve, ring means encircling the shaft adjacent the path of the element, an inflatable bag supported adjacent the ring means, and means for inflating the bag to expand the same and thereby shift the ring means axially to move the element and continuously actuate the valve during rotation of the shaft.

GLENN H. ORR.